United States Patent
Biverot

(10) Patent No.: US 6,611,384 B1
(45) Date of Patent: Aug. 26, 2003

(54) METHOD AND ARRANGEMENT FOR SUPERIMPOSING AN IMAGE ON A DIRECT IMAGE OF THE SURROUNDINGS IN ORDER TO BE DISPLAYED TO AN OBSERVER

(75) Inventor: Hans Biverot, Hasselby (SE)

(73) Assignee: Saab AB, Linkoping (SE)

( * ) Notice: Subject to any disclaimer, the term of this patent is extended or adjusted under 35 U.S.C. 154(b) by 0 days.

(21) Appl. No.: 09/980,008

(22) PCT Filed: May 26, 2000

(86) PCT No.: PCT/SE00/01078

§ 371 (c)(1),
(2), (4) Date: Feb. 28, 2002

(87) PCT Pub. No.: WO00/74380

PCT Pub. Date: Dec. 7, 2000

(30) Foreign Application Priority Data

May 31, 1999 (SE) ................................................ 9901979

(51) Int. Cl.$^7$ ........................... G02B 27/14; G09G 5/00
(52) U.S. Cl. ....................... 359/630; 359/631; 359/633; 359/146; 359/462; 345/7; 345/8
(58) Field of Search ................. 359/630, 631, 359/632, 633, 629, 146, 462, 623; 345/7, 8, 9; 356/141.3, 139.03; 224/181

(56) References Cited

U.S. PATENT DOCUMENTS

| | | | |
|---|---|---|---|
| 4,652,870 A | * | 3/1987 | Steward ........................ 345/7 |
| 4,722,601 A | | 2/1988 | McFarlane ............... 356/141.3 |
| 5,005,213 A | | 4/1991 | Hanson et al. .............. 359/146 |
| 5,007,711 A | * | 4/1991 | Wood et al. ................ 359/633 |
| 5,325,386 A | | 6/1994 | Jewell et al. .................. 372/50 |
| 5,612,708 A | | 3/1997 | Ansley et al. .................. 345/8 |
| 5,657,163 A | * | 8/1997 | Wu et al. .................... 359/630 |
| 5,721,679 A | | 2/1998 | Monson ...................... 701/207 |
| 5,805,119 A | * | 9/1998 | Erskine et al. ................. 345/7 |
| 5,883,739 A | | 3/1999 | Ashihara et al. ............ 359/462 |
| 6,097,353 A | * | 8/2000 | Melville et al. ................ 345/8 |

FOREIGN PATENT DOCUMENTS

| | | |
|---|---|---|
| EP | 0518834 | 12/1992 |
| FR | 1536792 | 7/1968 |
| GB | 2154020 | 8/1985 |
| WO | WO 95/34014 | 12/1995 |
| WO | WO 97/14135 | 4/1997 |

* cited by examiner

*Primary Examiner*—Loha Ben
(74) *Attorney, Agent, or Firm*—Connolly Bove Lodge & Hutz LLP

(57) ABSTRACT

The present invention relates to a method and an arrangement for superimposing an image on a direct image of the surroundings in order to be displayed to an observer (7). To generate the image which is to be superimposed on the direct image of the surroundings use is made of a line transmitter (1) for transmitting two-dimensional image information in linear form and a converter (2) for converting the image information in linear form into a two-dimensional image. The line transmitter (1) is located in a different direction from the image of the surroundings of the observer, and a direction-changing means (3, 4) is arranged so as to angle the radiation from the line transmitter in a direction towards the eyes (8) of the observer (7). According to the invention the converter (2) is separate from the line transmitter and arranged in proximity to the direction-changing means.

20 Claims, 2 Drawing Sheets

METHOD AND ARRANGEMENT FOR SUPERIMPOSING AN IMAGE ON A DIRECT IMAGE OF THE SURROUNDINGS IN ORDER TO BE DISPLAYED TO AN OBSERVER

BACKGROUND OF THE INVENTION

The present invention relates to a method for superimposing an image on a direct image of the surroundings in order to be displayed to an observer, the image which is to be superimposed being angled in towards the eye(s) of the observer from a different direction from the image of the surroundings and being generated starting from a line transmitter with image information which is two-dimensional in the time within the integration time of the eye and is converted into a two-dimensional image. The invention also relates to an arrangement for superimposing an image on a direct image of the surroundings in order to be displayed to the eyes of an observer, comprising a line transmitter for transmitting two-dimensional image information in linear form located in a different direction from the image of the surroundings, a converter for converting the image information in linear form into a two-dimensional image and a direction-changing means arranged so as to angle the radiation from the line transmitter in a direction towards the eyes of the observer.

A method and an arrangement according to the first paragraph are previously known from WO A2 9534014. This patent relates to an integrated spatially fixed display, in which the image content in a linear array is converted into a two-dimensional image in direct proximity to the linear array by means of a rotating mirror arrangement. In order to produce a large image, the arrangement has to be expanded in two dimensions.

This makes the arrangement bulky and difficult to position.

SUMMARY OF THE INVENTION

One object of the invention is to provide an arrangement which does not require the same space and is easier to position. The object of the invention is achieved by means of a method characterized in that the image information is converted into a two-dimensional image in proximity to the area in which the image is directed in towards the eyes of the observer, and an arrangement characterized in that the converter for converting the image information in linear form into a two-dimensional image is separate from the line transmitter and arranged in proximity to the direction-changing means. By means of the invention, which divides the display function into two separate parts, an arrangement is produced, which essentially expands in one dimension when the image is made larger.

An arrangement comprising a line transmitter with a separate converter is previously known from our patent EP 518 834. This document relates to a converter worn by the observer, the observer observing a linear display in his normal direction of vision. The present invention builds up the image displayed to the observer in a different manner by including the converter in proximity to the direction-changing means, where image information transmitted by the line transmitter is angled in towards the eye(s) of the observer and is superimposed on a direct image of the surroundings. Image superimposition in combination with a line transmitter with two-dimensional information affords great opportunities for compact designs, for example in vehicle applications.

The conversion of the image which is to be superimposed is carried out in equipment which is installed in a fixed manner relative to the line transmitter. Examples of converters are described in inter alia the EP document mentioned above and the patent SE 9503505-1. When use is made of equipment installed in a fixed manner, no equipment like spectacles worn by the observer is required, which should appeal to certain users.

The image which is to be superimposed on the direct image of the surroundings can also advantageously be an image of the surroundings obtained by means of, for example, an IR camera or some type of image intensifier. By combining the direct image with an IR image, markedly improved possibilities are afforded for driving in the dark and thus improved road safety. Alternatively, the image which is to be superimposed can be a synthesized image in the form of, for example, a map or symbols. In this way, it is made easier for the driver to handle the vehicle safely.

For converting the image information into a two-dimensional image, the converter consists, according to an advantageous embodiment in the case of fixed installation, of a deflector with deflection which is variable in time.

According to another advantageous embodiment, the direction-changing means consists of a mirror and a beam splitter in interaction.

According to a further advantageous embodiment, the beam splitter and the converter are arranged in an essentially common plane.

According to an expedient embodiment, when installed in a vehicle, the converter and the direction-changing means are arranged in proximity to the upper part of the front window of the vehicle, and the line transmitter is arranged, for example in proximity to the dashboard of the vehicle, so as to transmit in the direction towards the converter and the direction-changing means. In this connection, the converter and the direction-changing means are advantageously integrated with the sun visor of the vehicle. Installation in the above manner makes effective use of the spaces in a vehicle. Installation requires a minimum of space because an existing sun visor can be replaced by a modified sun visor with extended functioning, and the line transmitter can be arranged in the longitudinal direction of the dashboard.

According to an advantageous embodiment, in order to provide the line transmitter with image information, a camera, such as an IR camera or image intensifier, is arranged so as to transmit to the line transmitter the image information which is to be superimposed on the image of the surroundings. Alternatively, a sensor, such as a radar sensor or laser sensor, can be arranged so as to transmit to the line transmitter the image information which is to be superimposed on the image of the surroundings. It is common to all the camera and sensor variants that it is possible for the observer, usually the driver, to obtain valuable additional information which can make driving the vehicle easier.

BRIEF DESCRIPTION OF THE DRAWINGS

The invention is described below in the form of examples with reference to the appended drawings, in which.

DETAILED DESCRIPTION OF THE INVENTION

Figure 1:
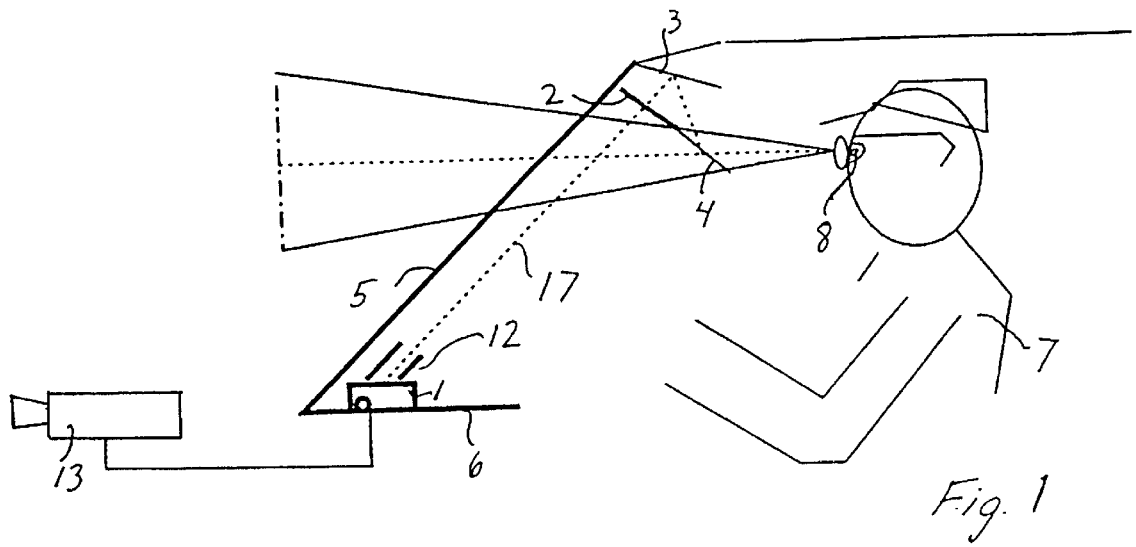
FIG. 1 shows a first exemplary embodiment of an arrangement for superimposing an image on a direct image of the surroundings using a camera.

The arrangement shown in FIG. 1 for superimposing an image on a direct image comprises a line transmitter 1 for transmitting two-dimensional image information in linear form, a converter 2 for converting the image information in linear form into a two-dimensional image, and a direction-changing means 3, 4. The arrangement is preferably accommodated in a vehicle. The vehicle can be, for example, a passenger car, a lorry or a bus. Other vehicles suitable for installation of the arrangement according to the invention are ships and various types of military vehicle. The examples of vehicles given above do not exclude installation in other types of vehicle.

According to the exemplary embodiment in FIG. 1, the arrangement is installed in proximity to a window-pane 5, preferably the front pane of a vehicle. In this connection, the dashboard 6 of the vehicle is used in order to accommodate the line transmitter 1, and the converter 2 and the direction-changing means have been positioned in proximity to the sun visor of the vehicle and can, as shown, form an integrated part of the sun visor.

The line transmitter 1 works at such a frequency that image information relating to a two-dimensional image is transmitted in linear form within the integration time of the eyes 8 of an observer 7. In order to reduce; the scattering of the light transmitted by the line transmitter, a screen 12 is arranged so as to provide shielding of the transmitted light.

Figure 4:
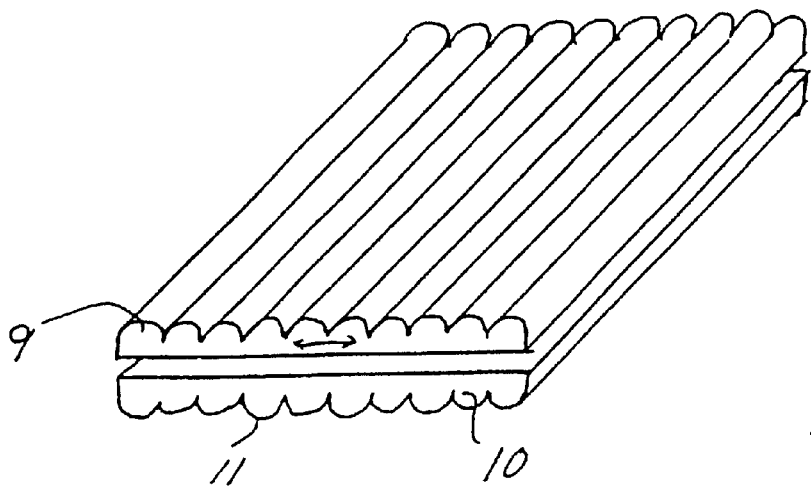
FIG. 4 shows an example of how a converter included in the arrangement can be designed.

According to the exemplary embodiment shown diagrammatically in FIG. 4, the converter can in principle be designed as a deflector with two optical plates 9, 10 with elongate domed sections 11, which plates can be displaced in a parallel manner in relation to one another. By displacing the plates in relation to one another, the deflection to which an incident ray is subjected is varied. The principles for deflectors of this type have been described in greater detail in our Swedish patent 504 419.

In the example shown in FIG. 1, the direction changing means consists of a mirror 3 and a beam splitter 4.

A camera 13 is mounted on the outside of the vehicle. The camera expediently consists of an IR camera or image intensifier and its function is to transmit the image information which is to be superimposed on the direct image of the surroundings to the line transmitter 1.

The embodiment shown in FIG. 1 can function in the following manner. The observer 7 first lowers the converter 2 and the direction-changing means 3, 4, both of which can be integrated in a sun visor. The observer can then see directly out through the front pane 5 via the beam splitter 4 which lets through light entering through the front pane. The camera 13 mounted outside the vehicle, which can here be assumed to be an IR camera, scans the area in front of the vehicle. The image information gathered by the IR camera is transmitted, after processing, to the line transmitter 1. The line transmitter 1 transmits two-dimensional image information in the direction towards the direction-changing means 3, 4 and the converter 2. The converter 2, which can be designed according to FIG. 4 and then functions as a deflector, deflects the radiation 17 from the line transmitter variably during the integration time for the observer 7, after which the radiation is reflected in the mirror 3 and the beam splitter 4. By means of the variable deflection during the integration time of the eye, lines transmitted by the line transmitter 1 are "drawn out" to form a two-dimensional image. The "drawn out" image from the line transmitter is superimposed on the direct image received from outside the vehicle in the beam splitter 4, and an image superimposed on the direct image of the surroundings is displayed to the observer 7.

In the exemplary embodiments described below, parts which are common to the embodiment described with reference to FIG. 1 have been given the same reference numbers and are in general not commented on further because they have the corresponding function.

Figure 2:
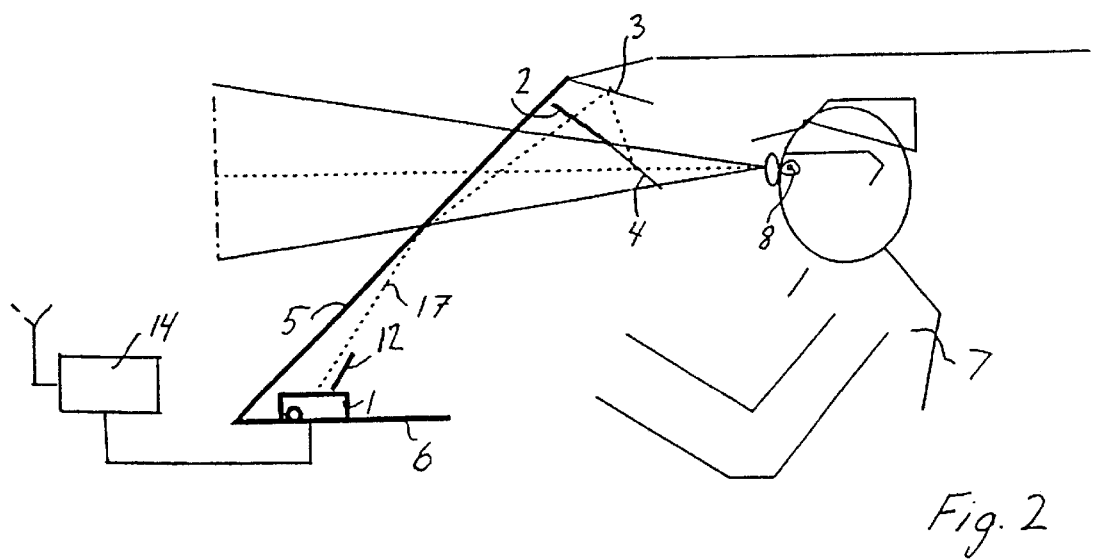
FIG. 2 shows a second exemplary embodiment of an arrangement for superimposing an image on a direct image of the surroundings using a sensor and reflection in a window-pane.

In the embodiment shown in FIG. 2, the line transmitted by the line transmitter has been angled slightly differently in comparison with the embodiment according to FIG. 1. According to the embodiment in FIG. 2, use is made of the windscreen 5 of the vehicle as a reflecting surface for the transmitted image information in linear form. The use of some form of sensor 14, such as for example a radar sensor or laser sensor, in order to obtain image information for the line transmitter 1 is also proposed here. Within the automotive industry, intensive development work is currently being carried out in order to produce cruise controls and anti-collision aids to make driving easier and safer. In such fields, use is made of radar and/or laser sensors for obtaining information. The arrangement according to the invention for image superimposition is highly suitable for integration into such systems in which radar and/or laser sensors can be common to our arrangement and other aids.

Figure 3:
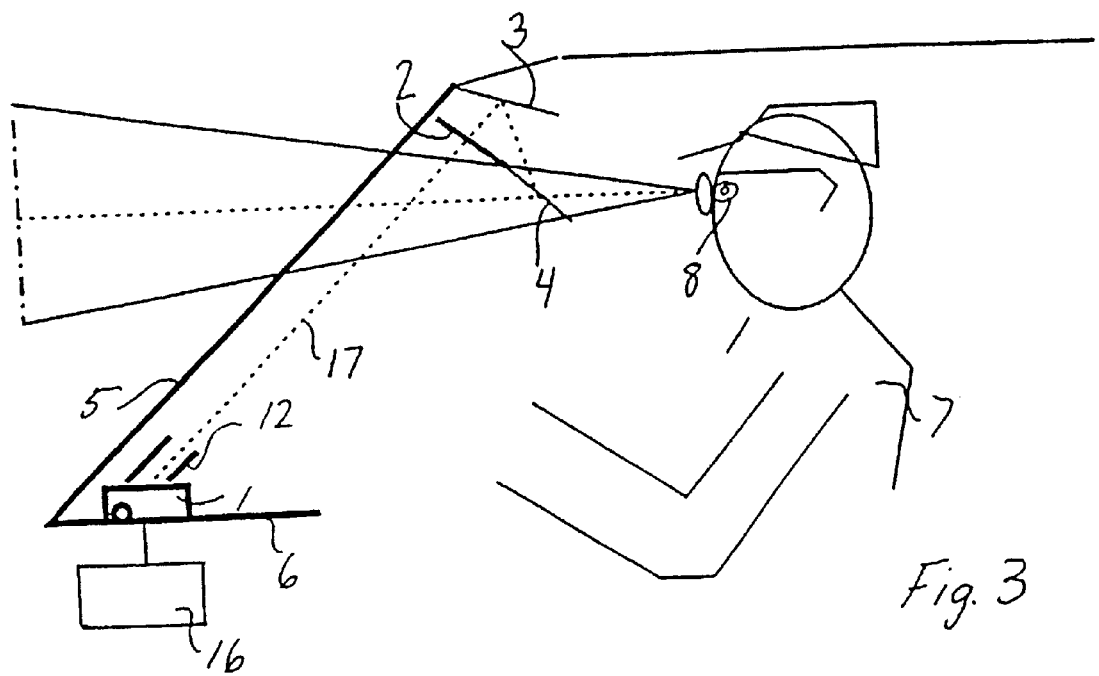
FIG. 3 shows a third exemplary embodiment of an arrangement for superimposing an image on a direct image of the surroundings using stored image information.

A further example is shown in FIG. 3. In this case, the synthetic image which is to be shown to the observer 7 is stored in a memory unit 16. The synthetic image can consist of, for example, a map or some form of symbols.

The invention is in no way limited to the embodiments described, and the scope of the invention includes a great many alternative embodiments as defined by the patent claims.

What is claimed is:

1. Method for superimposing an image on a direct image of the surroundings in order to be displayed to an observer, the image which is to be superimposed being angled in towards the eye(s) of the observer from a different direction from the image of the surroundings and being generated starting from a line transmitter with image information which is two-dimensional in the time within the integration time of the eye and is converted into a two-dimensional image, characterized in that the image information is converted into a two-dimensional image in proximity to the area in which the image is directed in towards the eyes of the observer.

2. Method according to claim 1, characterized in that the image which is to be superimposed on the direct image of the surroundings consists of an image of the surroundings.

3. Method according to claim 2, characterized in that the image which is to be superimposed on the direct image of the surroundings consists of a synthesized image in the form of a map or symbols.

4. Method according to claim 1, characterized in that the image which is to be superimposed on the direct image of the surroundings consists of a synthesized image in the form of a map or symbols.

5. Arrangement for superimposing an image on a direct image of the surroundings in order to be displayed to the eyes of an observer, comprising a line transmitter for transmitting two-dimensional image information in linear form located in a different direction from the image of the surroundings, a converter for converting the image information in linear form into a two-dimensional image and a direction-changing means arranged so as to angle the radiation from the line transmitter in a direction towards the eyes of the observer, characterized in that the converter for converting the image information in linear form into a two-dimensional image is separate from the line transmitter and arranged in proximity to the direction-changing means.

6. Arrangement according to claim 5, characterized in that the converter consists of a deflector with deflection which is variable in time.

7. Arrangement according to claim 6, characterized in that the direction-changing means consists of a mirror and beam splitter in interaction.

8. Arrangement according to claim 6, intended for installation in a vehicle, characterized in that the converter and the direction-changing means are arranged in proximity to the upper part of the front window of the vehicle, and in that the line transmitter is arranged in proximity to the dashboard of the vehicle, so as to transmit in the direction towards the converter and the direction-changing means.

9. Arrangement according to claim 6, characterized in that an IR camera or image intensifier, is arranged so as to transmit to the line transmitter the image information which is to be superimposed on the image of the surroundings.

10. Arrangement according to claim 5, characterized in that the direction-changing means consists of a mirror and beam splitter in interaction.

11. Arrangement according to claim 10, intended for installation in a vehicle, characterized in that the converter and the direction-changing means are arranged in proximity to the upper part of the front window of the vehicle, and in that the line transmitter is arranged in proximity to the dashboard of the vehicle, so as to transmit in the direction towards the converter and the direction-changing means.

12. Arrangement according to claim 10, characterized in that an IR camera or image intensifier, is arranged so as to transmit to the line transmitter the image information which is to be superimposed on the image of the surroundings.

13. Arrangement according to claim 10, characterized in that the beam splitter and the converter are arranged in an essentially common plane.

14. Arrangement according to claim 13, intended for installation in a vehicle, characterized in that the converter and the direction-changing means are arranged in proximity to the upper part of the front window of the vehicle, and in that the line transmitter is arranged in proximity to the dashboard of the vehicle, so as to transmit in the direction towards the converter and the direction-changing means.

15. Arrangement according to claim 13, characterized in that an IR camera or image intensifier, is arranged so as to transmit to the line transmitter the image information which is to be superimposed on the image of the surroundings.

16. Arrangement according to claim 5, intended for installation in a vehicle, characterized in that the converter and the direction-changing means are arranged in proximity to the upper part of the front window of the vehicle, and in that the line transmitter is arranged in proximity to the dashboard of the vehicle, so as to transmit in the direction towards the converter and the direction-changing means.

17. Arrangement according to claim 16, characterized in that the converter and the direction-changing means are integrated with the sun visor of the vehicle.

18. Arrangement according to claim 16, characterized in that an IR camera or image intensifier, is arranged so as to transmit to the line transmitter the image information which is to be superimposed on the image of the surroundings.

19. Arrangement according to claim 5, characterized in that an IR camera or image intensifier, is arranged so as to transmit to the line transmitter the image information which is to be superimposed on the image of the surroundings.

20. Arrangement according to claim 5, characterized in that a radar sensor or laser sensor, is arranged so as to transmit to the line transmitter the image information which is to be superimposed on the image of the surroudings.

* * * * *